United States Patent
Tan et al.

(10) Patent No.: US 8,793,537 B2
(45) Date of Patent: Jul. 29, 2014

(54) COMPUTING DEVICE AND METHOD FOR DETECTING MEMORY ERRORS OF THE COMPUTING DEVICE

(75) Inventors: Jie-Jun Tan, Shenzhen (CN); Yu-Long Lin, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 200 days.

(21) Appl. No.: 13/474,620

(22) Filed: May 17, 2012

(65) Prior Publication Data

US 2012/0331349 A1 Dec. 27, 2012

(30) Foreign Application Priority Data

Jun. 24, 2011 (CN) .......................... 2011 1 0173063

(51) Int. Cl.
*G06F 11/00* (2006.01)
(52) U.S. Cl.
USPC .............................................. 714/42; 714/27
(58) Field of Classification Search
CPC ............ G06F 11/3037; G06F 11/3041; G06F 11/3051
USPC .......................................... 714/27, 37, 40, 42
See application file for complete search history.

(56) References Cited

U.S. PATENT DOCUMENTS

| | | | | |
|---|---|---|---|---|
| 5,884,067 | A * | 3/1999 | Storm et al. ................... | 345/533 |
| 8,028,198 | B2 * | 9/2011 | Resnick .......................... | 714/42 |
| 2004/0034825 | A1 * | 2/2004 | Jeddeloh ........................ | 714/733 |
| 2004/0073829 | A1 * | 4/2004 | Olarig ............................ | 714/6 |
| 2007/0195572 | A1 * | 8/2007 | Dreps et al. .................... | 365/63 |
| 2012/0216079 | A1 * | 8/2012 | Fai et al. ........................ | 714/42 |

\* cited by examiner

*Primary Examiner* — Joshua Lohn
(74) *Attorney, Agent, or Firm* — Novak Druce Connolly Bove + Quigg LLP

(57) ABSTRACT

In a method for detecting memory errors occurring in a computing device, a channel number of an error memory module is obtained from a first register of a memory controller of the computing device. The method analyzes an error type to obtain a rank number of the memory module from one or more specified registers of the memory controller, and finds a serial number of a memory slot into which the memory module has been inserted. According to the serial number of the memory slot and a distribution list, the method can detect the memory slot which is carrying the memory module.

12 Claims, 3 Drawing Sheets

COMPUTING DEVICE AND METHOD FOR DETECTING MEMORY ERRORS OF THE COMPUTING DEVICE

BACKGROUND

1. Technical Field

Embodiments of the present disclosure generally relate to methods of finding memory errors in computing devices, and more particularly to a computing device, a storage medium and a method for detecting memory errors of the computing device.

2. Description of Related Art

A storage system of a server may break down when the storage system has an error. Thus, many servers often have a memory-management device that has an error check correct (ECC) function to prevent these errors from happening. But once a test software of the server detects an error in a memory module of the server, the test software can report a virtual address of the memory, but cannot report which memory module has suffered an error, or report which memory slot inserted with the memory module is subject to an error condition. In related art, a user has to manually detect which memory module has the error by inserting each memory module into each memory slot of the server and by testing each memory module repeatedly. However, an efficiency of the manual detecting method is low. Therefore, an improved method is desirable to address the aforementioned issues.

DETAILED DESCRIPTION

In general, the term "module," as used herein, refers to logic embodied in hardware or firmware, or to a collection of software instructions, written in a programming language, such as, for example, Java, C, or assembly. One or more software instructions in the modules may be embedded in firmware, such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable medium or computer storage device. It should be understood that the term "memory module" as used herein, refers to physical individual pieces (sticks) of memory in a computing system.

It should be understood that each rank (as defined by JEDEC) of a DDR, DDR2, or DDR3 memory module has a 64-bit wide data bus (with an optional extra 8-bit ECC on some DIMMs). The number of physical DRAMs depends on their individual widths. For example, a rank of x8 (8-bit) DRAMs consists of 8 physical chips (plus one for ECC), but a rank of x4 (4-bit) DRAMs consists of 16 physical chips (plus two for ECC). Multiple ranks can coexist on a single DIMM, and modern DIMMs can consist of one rank (single rank), two ranks (dual rank), four ranks (quad rank), or eight ranks (octal rank). Each memory module has a serial number (hereinafter referred to as rank number). Because one memory module includes one or more memory sub-modules, each memory module may have one or more rank numbers.

Figure 1:
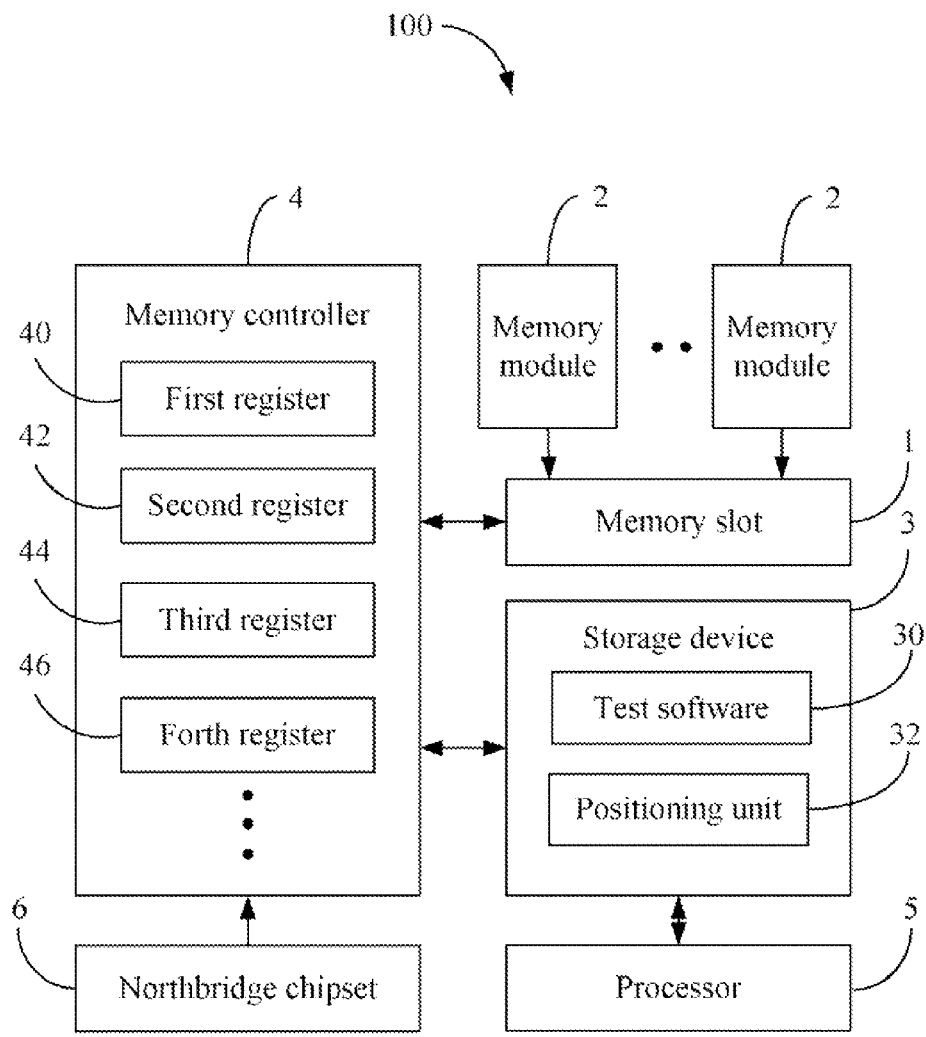
FIG. 1 is a block diagram of one embodiment of a computing device including an error detecting unit.

FIG. 1 is a block diagram of one embodiment of a computing device 100 including an error detecting unit 32. The computing device 100 further includes one or more memory slots 1, a plurality of memory modules 2, a storage device 3, a memory controller 4 installed on a Northbridge chipset 6, at least one processor 5, and a display screen 7. In the embodiment, each of the memory modules 2 is a hardware storage unit for storing data or programs of the computing device 100, and is inserted into one of the memory slots 1. The memory controller 4 includes one or more registers that have error check correct (ECC) functions, such as a first register 40, a second register 42, a third register 44, and a fourth register 46.

In the embodiment, the error detecting unit 32 is stored in the storage device 3. Functions of the error detecting unit 32 are described in FIG. 2 and FIG. 3 in detail. The storage device 3 further includes test software 30 that is used for testing the memory modules 2 of the computing device 100.

In one embodiment, the storage device 3 may be a magnetic or an optical storage device, such as a hard disk drive, an optical drive, a compact disc, a digital video disc, a tape drive, or other suitable storage medium. The processor 5 may be a central processing unit including a math co-processor, for example. The computing device 100 may be a server, a computer, a portable electronic device, or any other data processing device.

Figure 2:
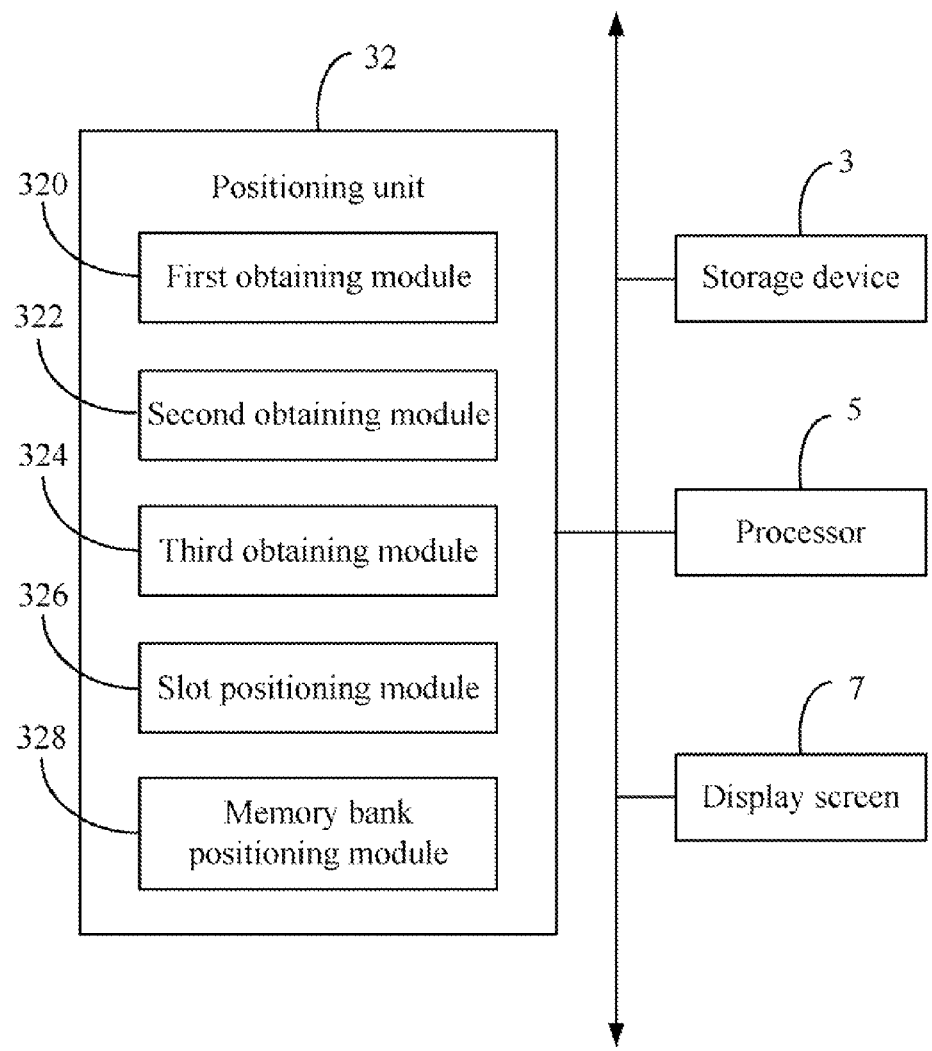
FIG. 2 is a block diagram of one embodiment of function module of the error detecting unit in FIG. 1.

FIG. 2 is a block diagram of one embodiment of function modules of the error detecting unit 32 in FIG. 1. In the embodiment, the error detecting unit 32 includes a first obtaining module 320, a second obtaining module 322, a third obtaining module 324, a slot detecting module 326, and a memory module detecting module 328. Each of the modules 320-328 may be a software program including one or more computerized instructions that are stored in the storage device 3 and executed by the processor 5 to provide functions of the computing device 100.

The test software 30 tests all of the memory modules 2 installed in the computing device 100. When data cannot be written in or read from the computing device 100, the test software 30 detects that an error occurs in a memory module 2 (hereinafter error memory module), and the memory controller 4 records a channel number, an error type, and a rank number of the error memory module 2 in specified registers. For example, the memory controller 4 records the channel number of the error memory module 2 in the first register 40, records the error type of the error memory module 2 in the second register 42, and records the rank number of the error memory module 2 in the third register 44 or in the fourth register 46.

The first obtaining module 320 obtains the channel number of the error memory module 2 from the first register 40. In the embodiment, each of the memory modules 2 has a unique channel number that may be represented by number zero or number one, and so on.

The second obtaining module 322 obtains the error type of the error memory module 2 from the second register 42. In the embodiment, the error type includes a recoverable error type, and a non-recoverable error type.

The third obtaining module 324 obtains the rank number of the error memory module 2 either from the third register 44 or from the fourth register 46 according to the error type. In the embodiment, each of the memory modules 2 has one or more rank numbers, and each of the rank numbers may be represented by digit zero, one, two, three, four, or five, for example. In detail, each error type corresponds to a specified register for recording the rank numbers of the error memory modules 2. For example, the third register 44 records the rank numbers of the error memory modules 2 that have a recoverable error type, and the fourth register 46 records the rank numbers of the error memory modules 2 that have a non-recoverable error type.

The slot detecting module 326 finds a serial number of a memory slot 1 by searching a mapped table according to the channel number and the rank number of the error memory module 2, and may determine that the memory slot 1 is inserted with the error memory module 2. In the embodiment, the serial number is used for indicating which DIMM slot the error memory module 2 is inserted into.

For example, the mapped table is illustrated as follows:

| Channel number | Rank number | DIMM Slot |
| --- | --- | --- |
| 0 | 0 or 1 | DIMMNV-1 |
| 0 | 2 or 3 | DIMM-1 |
| 0 | 4 or 5 | DIMM-3 |
| 1 | 0 or 1 | DIMMNV-2 |
| 1 | 2 or 3 | DIMM-2 |
| 1 | 4 or 5 | DIMM-4 |

The memory module detecting module 328 detects a position of the error memory module 2 from the plurality of memory modules 2 according to the serial number of the memory slot 1 and a distribution list of the plurality of memory modules 2. In the embodiment, the distribution list is a list for recording a serial number of each of the memory modules 2 and a location of where each of the memory modules 2 is inserted into the memory slot 1. For example, the channel number of the error memory module 2 obtained from the first register 40 may be channel zero, the error type of the error memory module 2 is the recoverable error type, and the third obtaining module 324 reads the rank number of the error memory module 2 as number one, from the third register 44. The slot detecting module 326 finds that the serial number of the memory slot 1 is "DIMMNV-1." According to the serial number "DIMMNV-1" and the distribution list, the memory module detecting module 328 can obtain the serial number of the error memory module 2 that is inserted into the memory slot 1, and it has the serial number "DIMMNV-1."

In the embodiment, the memory module detecting module 328 further displays the serial number of the error memory module 2 on the display screen 7. As such, a user can find which memory module 2 is subject to an error according to the serial number of the error memory module 2.

Figure 3:
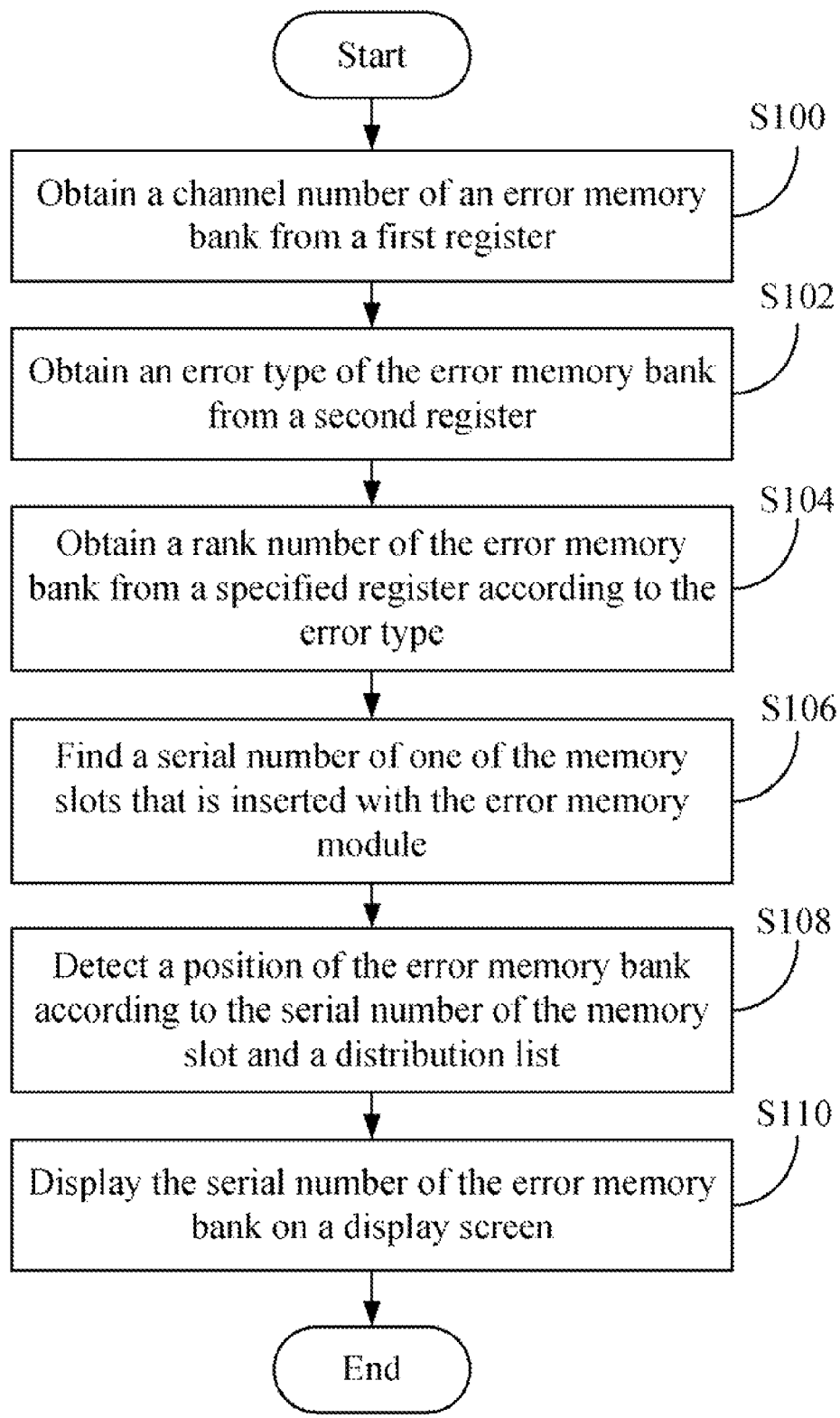
FIG. 3 is a flowchart illustrating one embodiment of a method for detecting memory errors occurred in the computing device of FIG. 1.

FIG. 3 is a flowchart illustrating one embodiment of a method for detecting an error occurring in the computing device 100 of FIG. 1. Depending on the embodiment, additional blocks may be added, others removed, and the ordering of the blocks may be changed.

When the test software 30 detects that data cannot be written in or read from one memory module 2 of the computing device 100, the test software 30 determines that the memory module 2 has an error. The processor 5 of the computing device 100 may execute following steps to find the position of the memory module 2 (hereinafter error memory module 2).

In block S100, the first obtaining module 320 obtains a channel number of the error memory module 2 from the first register 40. In one embodiment, each of the memory modules 2 has a unique channel number that may be represented by number zero or number one, and so on.

In block S102, the second obtaining module 322 obtains an error type of the error memory module 2 from the second register 42. In the embodiment, the error type may be a recoverable error type, or a non-recoverable error type.

In block S104, the third obtaining module 324 obtains a rank number of the error memory module 2 from the third register 44 or the fourth register 46 according to the error type. In the embodiment, each of the memory modules 2 has one or more rank numbers, and each of the rank numbers may be represented by digit zero, one, two, three, four, or five, for example. Each error type corresponds to a specified register for recording the rank numbers of error memory modules 2. For example, if the error type of the error memory module 2 is the recoverable error type, the third obtaining module 324 obtains the rank number of the error memory module 2 from the third register 44. Otherwise, if the error type of the error memory module 2 is the non-recoverable error type, the third obtaining module 324 obtains the rank number of the error memory module 2 from the fourth register 46.

In block S106, the slot detecting module 326 searches a mapped table, to find a serial number of one of the memory slots 1 that is inserted with the error memory module 2 according to the channel number and the rank number. In the embodiment, the serial number is used for indicating which DIMM slot the error memory module 2 is inserted into.

In block S108, the memory module detecting module 328 detects a position of the error memory module 2 from the plurality of memory modules 2 according to the serial number of the memory slot 1 and a distribution list of the plurality of memory modules 2. In the embodiment, the distribution list is a list for recording a serial number of each of the memory modules 2 and the location of where each of the memory modules 2 is inserted into the memory slot 1. In the embodiment, according to the serial number of the memory slot 1 and the distribution list, the memory module detecting module 328 also can obtain the serial number of the error memory module 2.

In block S110, the memory module detecting module 328 displays the serial number of the error memory module 2 on the display screen 7 of the computing device 100. As such, a user can find which particular memory module 2 where the error has occurred according to the serial number of the error memory module 2.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method of a computing device for detecting memory errors, the computing device comprising a plurality of memory modules inserted into one or more memory slots of the computing device, the method comprising:

in response to determining that one of the plurality of memory modules has an error, obtaining a channel number of the memory module that has the error from a first register of a memory controller of the computing device, the determining upon the condition that the memory module is incapable of writing or reading data;

obtaining an error type of the memory module that has the error from a second register of the memory controller;

obtaining a rank number of the memory module that has the error from a specified register of the memory controller according to the error type;

searching a mapped table to find a serial number of one of the memory slots that is inserted with the memory module having the error according to the channel number and the rank number; and detecting a position of the memory module that has the error from the plurality of memory modules that are inserted into the memory slot according to the founded serial number and a distribution list of the plurality of memory modules, the distribution list being a list that records a serial number of each of the memory modules and a location of where each of the memory modules is inserted into the memory slot.

2. The method as described in claim 1, wherein the error type comprises a recoverable error type, and a non-recoverable error type.

3. The method as described in claim 1, further comprising:
displaying a serial number of the memory module that has the error on a display screen of the computing device.

4. The method as described in claim 1, wherein the memory controller comprises one or more registers that have error check correct functions, and is installed on a Northbridge chipset of the computing device.

5. An computing device, comprising:
a plurality of memory modules;
a memory controller;
one or more memory slots inserted with the plurality of memory modules;
a storage device and at least one processor; and
one or more modules that are stored in the storage device and executed by the at least one processor, the one or more modules comprising:
a first obtaining module that obtains a determination of a memory module having an error upon the condition that the memory module is incapable of writing or reading data, and obtains a channel number of the memory module that has the error from a first register of a memory controller of the computing device;
a second obtaining module that obtains an error type of the memory module that has the error from a second register of the memory controller;
a third obtaining module that obtains a rank number of the memory module that has the error from a specified register of the memory controller according to the error type;
a slot detecting module that searches a mapped table to find a serial number of one of the memory slots that is inserted with the memory module having the error according to the channel number and the rank number; and
a memory module detecting module that detects a position of the memory module that has the error from the plurality of memory modules that are inserted into the memory slot according to the founded serial number and a distribution list of the plurality of memory modules, the distribution list being a list that records a serial number of each of the memory modules and a location of where each of the memory modules is inserted into the memory slot.

6. The computing device as described in claim 5, wherein the error type comprises a recoverable error type, and a non-recoverable error type.

7. The computing device as described in claim 5, wherein the memory module detecting module further displays a serial number of the memory module that has the error on a display screen of the computing device.

8. The computing device as described in claim 5, wherein the memory controller comprises one or more registers that have error check correct functions, and is installed on a Northbridge chipset of the computing device.

9. A non-transitory computer readable storage medium having stored thereon instructions that, when executed by a processor of a computing device, causes the processor to perform a method of a computing device for detecting memory errors, the computing device comprising a plurality of memory modules inserted into one or more memory slots of the computing device, the method comprising:
in response to determining that one of the plurality of memory modules has an error, obtaining a channel number of the memory module that has the error from a first register of a memory controller of the computing device, the determining upon the condition that the memory module is incapable of writing or reading data;
obtaining an error type of the memory module that has the error from a second register of the memory controller;
obtaining a rank number of the memory module that has the error from a specified register of the memory controller according to the error type;
searching a mapped table to find a serial number of one of the memory slots that is inserted with the memory module having the error according to the channel number and the rank number; and
detecting a position of the memory module that has the error from the plurality of memory modules that are inserted into the memory slot according to the founded serial number and a distribution list of the plurality of memory modules, the distribution list being a list that records a serial number of each of the memory modules and a location of where each of the memory modules is inserted into the memory slot.

10. The storage medium as described in claim 9, wherein the error type comprises a recoverable error type, and a non-recoverable error type.

11. The storage medium as described in claim 9, wherein the method further comprises:
displaying a serial number of the memory module that has the error on a display screen of the computing device.

12. The storage medium as described in claim 9, wherein the memory controller comprises one or more registers that have error check correct functions, and is installed on a Northbridge chipset of the computing device.

* * * * *